(12) United States Patent
Rhee et al.

(10) Patent No.: US 6,341,303 B1
(45) Date of Patent: Jan. 22, 2002

(54) SYSTEM AND METHOD FOR SCHEDULING A RESOURCE ACCORDING TO A PRECONFIGURED PLAN

(75) Inventors: Ann Rhee, Foster City; Sumanta K. Chatterjee, Fremont; Juan R. Loaiza, San Carlos, all of CA (US); Kesavan Srinivasan, Hudson, OH (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/141,664

(22) Filed: Aug. 28, 1998

(51) Int. Cl.[7] .................................................. G06F 9/00
(52) U.S. Cl. ...................... 709/104; 709/103; 710/240; 710/241; 710/244
(58) Field of Search ................................. 709/100, 101, 709/102, 103, 104, 105, 106, 107; 710/240, 241, 244

(56) References Cited

U.S. PATENT DOCUMENTS 6,003,061 A * 12/1999 Jones et al. ................. 709/104
6,223,201 B1 * 4/2001 Reinak ....................... 709/102

* cited by examiner

*Primary Examiner*—Majid A. Banankhah
(74) *Attorney, Agent, or Firm*—Park, Vaughan & Fleming LLP

(57) ABSTRACT

A scheduler for allocating a computer system resource, such as processor time, among processes (e.g., database processes) according to a plan. A scheduling plan may include multiple sub-plans, and each plan and sub-plan may include multiple classes of processes with associated weights or values. Within a plan, the resource is first allocated to the classes and/or sub-plans included in a first level of the plan according to their associated weights. Any unallocated portion of the resource is then allocated to classes/sub-plans in subsequent levels, in turn, according to their assigned weights. If a given class of processes is empty when the resource is allocated in a level including the class, the allocation that would have been allotted to the class may be carried over into the next level. An active scheduling plan may be dynamically replaced during system operations.

27 Claims, 7 Drawing Sheets

DATABASE PLAN 300

|         | LEVEL 1 | LEVEL 2 | LEVEL 3 |
|---------|---------|---------|---------|
| CLASS 1 | 100%    | 0%      | 0%      |
| CLASS 2 | 0%      | 100%    | 0%      |
| CLASS 3 | 0%      | 0%      | 100%    |

PRIORITY PLAN 400

FIG. 4

SYSTEM AND METHOD FOR SCHEDULING A RESOURCE ACCORDING TO A PRECONFIGURED PLAN

BACKGROUND

1. Field of the Invention

The present invention relates to computer operating systems. More specifically, the invention relates to a method of scheduling the use of a computer system resource according to a non-preemptive and dynamically selectable allocation scheme.

2. Related Art

Today's computer systems are relied upon to perform a variety of operations. Performance of the requested operations requires the use of various system resources (e.g., processor, memory, mass storage, network access). The busier the system (i.e., the more users connected to the system and the more processes or jobs running on the system), the greater the demand upon each such resource. Whenever more than one process or user at a time requires one of the computer's resources, the resource must be shared between the requesting entities. Thus, some form of resource allocation and scheduling is needed.

Operating systems, which manage the allocation of a computer's resources, share the usage of each resource among requesting entities in accordance with some pre-set scheme. For example, in a "round-robin" scheme the operating system divides usage of a resource by granting each requesting process full use of the resource for a relatively short period of time, and by rapidly switching use of the resource among all requesters. In an alternative scheme, requesting entities are grouped according to their associated priority. Those processes given relatively high priorities receive larger portions or more frequent use of the shared resource than processes assigned lower priorities.

Each of these schemes has disadvantages. For example, transferring use of a resource among numerous requesters in a round-robin scheme can be inefficient because during the time it takes to effect the transfer (commonly termed a "context switch") the resource is not being productively used. The more frequently the resource is transferred, the less time it is actually in use and the lower its overall efficiency. A priority scheme may somewhat alleviate the waste of resource time inherent in context switches by providing for longer use of the resource in between transfers, but will be unfair to those requesters that must wait longer periods of time to use the resource.

The chosen method of sharing a resource among multiple requesters typically affects all system users, whether they interface directly with the operating system or operate within an application environment (e.g., a database management system (DBMS), a word processor, a modeling system). For example, instead of directly accessing the necessary computer resources to manage access to database tables on behalf of numerous users, a database management system typically calls upon the operating system to handle such access. Users within application environments are thus dependent upon the scheduling scheme implemented by the operating system, which may not provide the most efficient access to resources needed by those users. Because the operating system schedules use of all resources among all requesters according to a set scheme, an environment or process that would benefit from a different scheduling scheme suffers. The operating system's method of allocating resources is not flexible enough, and usually cannot be customized, to provide for the optimal sharing of resources among all requesters.

In a large database management system, for example, which may have thousands of processes and jobs running to accomplish various tasks (e.g., retrieving data, storing data, generating a report), a scheduling scheme that attempts to give each job or process equal execution time by a processor can be particularly inefficient. With so many processes waiting to execute, the processor time wasted due to context switches becomes excessive. Similarly, attempting to control allocation of a processor's execution time among DBMS users and processes according to a priority scheme does not provide very effective control of the processor's time. The priority scheme merely allows one class of users or processes to be assigned a higher priority than another and thus receive faster or longer use of a resource. This scheme does not provide the ability to assign a particular class a set portion of processor execution time, thus preventing a database administrator from enabling the most effective control of resource allocation within the DBMS.

Relying upon the operating system's method of resource allocation means that the allocation scheme for distributing resources within the computer system often cannot be dynamically altered according to the demands of system users and processes. In addition, the operating system is usually separate from application environments such as database management systems and therefore generally cannot know what, if any, inter-relationships exist between individual database users, processes and resources. Thus, the operating system may switch a first database process out of a processor while the process holds (i.e., has reserved or been assigned) a resource needed by a second database process. If the second process needs the resource in order to execute, then it is effectively blocked from executing until the first process relinquishes the resource, which may not occur until after the first process receives additional processor time. This situation is often termed "deadlock." In a priority-based allocation scheme where the first process mentioned above is at a lower priority than the second process, this may be termed "priority inversion."

As mentioned above, neither a priority-based scheduling scheme nor a round-robin scheme allows resources to be shared in a truly efficient manner. High priority processes are merely guaranteed to receive more of a resource than low priority processes. If processes or groups of processes could be accorded a particular percentage of a resource, system administrators would be able to allocate resources with much finer granularity. Further, the scheduling scheme implemented by an operating system is set at the time the operating system is loaded and begins executing. If a system manager or user wishes to implement a different scheduling scheme (whether for all or selected environments and processes), the operating system must be re-initialized or rebooted.

Thus, there is a need in the art for a method of allocating or scheduling resource usage that allows efficient resource sharing with minimal waste of the resource. Such a method will allow greater control over scheduling decisions by a system administrator. In particular, a need exists for a method of allocating resources according to ratios or percentages. A need also exists for a method of dynamically modifying a resource allocation plan without disrupting operation of a computer system or an application environment.

SUMMARY

The present invention provides systems and methods for allocating a computer system resource among a plurality of resource requesters. In accordance with an embodiment of the invention, allocation of the resource is more finely controlled than has previously been possible. Resource requesters in the present embodiment include processes, jobs, and other entities operating within a computer system and requiring use of a system resource. Computer system resources that may be allocated or shared among resource requesters illustratively include a processor, memory, mass storage and communication bandwidth.

In one embodiment of the present invention, a database management system (DBMS) is provided. A resource scheduler within the DBMS allocates a processor's execution time (e.g., "quanta") among various requesting DBMS processes and jobs that require execution time in order to accomplish DBMS users' desired functions. The resource scheduler in this embodiment of the invention allocates processor time among classes of requesting processes and jobs according to dynamically selectable scheduling plans (e.g., during operation of the DBMS, the active scheduling plan can be changed). Scheduling plans in this embodiment comprise policies for allocating processor time between separate classes and/or among members of an individual class.

In one embodiment of the invention, resource requesters are grouped into classes based on their requirements for the resource, as specified by a database administrator (DBA). For example, in one illustrative plan classes are established for different processing functions (e.g., processing electronic mail or fixing programming errors). In another illustrative plan, resource requesters are classified according to their mode of execution (e.g., on-line, batch). After constructing requester classes, the DBA groups the classes in one or more scheduling plans. Only one plan at a time is active during operation of the DBMS, but each plan can include one or more sub-plans. Each sub-plan includes classes of requesters. During operation of the DBMS, a class can only be a member of one active plan or sub-plan and is thus allocated processor time only within that plan or sub-plan. Within each plan and sub-plan, processor time is assigned to the participating classes based on a policy.

In a present embodiment of the invention, an "emphasis" policy is provided in which processor time is allocated among a plan's classes and sub-plans by percentages. By adjusting the percentages, a DBA is able to increase or decrease the emphasis given to individual classes of resource requesters. In this embodiment, each plan and sub-plan implementing the emphasis policy is divided into multiple levels. Up to a maximum of 100% of the processor time available at a given level within a plan is distributed according to the percentages assigned to each class or sub-plan in the level. Thus, if 100% of processor time is allocated in the lowest, first level, classes in succeeding levels are shut out unless, as described below, a class is empty when its request for CPU time is granted.

One or more classes of resource requesters may participate in each level of a plan or sub-plan using the emphasis policy, and each class may participate in multiple levels of one plan or sub-plan. Processor time that is not allocated among the classes participating in the first level of a plan (or sub-plan) is available for allocation among the classes participating in subsequent levels. If processor time remains unallocated after being divided among the chosen number of levels, the remainder is recycled. In other words, after the total processor time is allocated among the classes participating in the first level of a plan, any processor time left over is allocated to the classes participating in the second level. Any processor time still remaining after allocation in the second level is carried over to the third level, and so on. Processor time left over after configuring the last level is distributed throughout the plan from the beginning.

During DBMS operation, when processor time is to be granted to a class of resource requesters within a particular level, if no requesters in the class are ready to execute, the processor time that the class would have received is carried over to the succeeding level.

Although only one scheduling plan is used at a time by the DBMS, multiple plans can be configured and stored, and the active plan can be changed at any time while the DBMS is running without restarting the operating system or DBMS. In a present embodiment, a plan may include one policy for allocating processor time between classes (e.g., the emphasis policy) and a separate policy for allocating processor time among the members of a single class (e.g., round-robin).

When operating conditions change (such as the composition of active DBMS users), a database administrator can activate one of the stored plans in place of the currently active plan. For example, the resource scheduler may first operate (e.g., during the business day) according to a plan that partitions processor time among classes of resource requesters according to the emphasis policy and a first set of percentages. Later, however (e.g., at night), a different plan may be implemented having the same classes but different percentages. Alternatively, the first scheduling plan may be changed to another plan in which processor time is allocated according to different classes or a different policy. In either event, the change in scheduling plan or policy can be made without restarting the DBMS.

DESCRIPTION OF THE FIGURES

FIG. 4 depicts one possible implementation of a priority resource allocation scheme, in accordance with an embodiment of the invention.

DEFINITIONS

Figure 1:
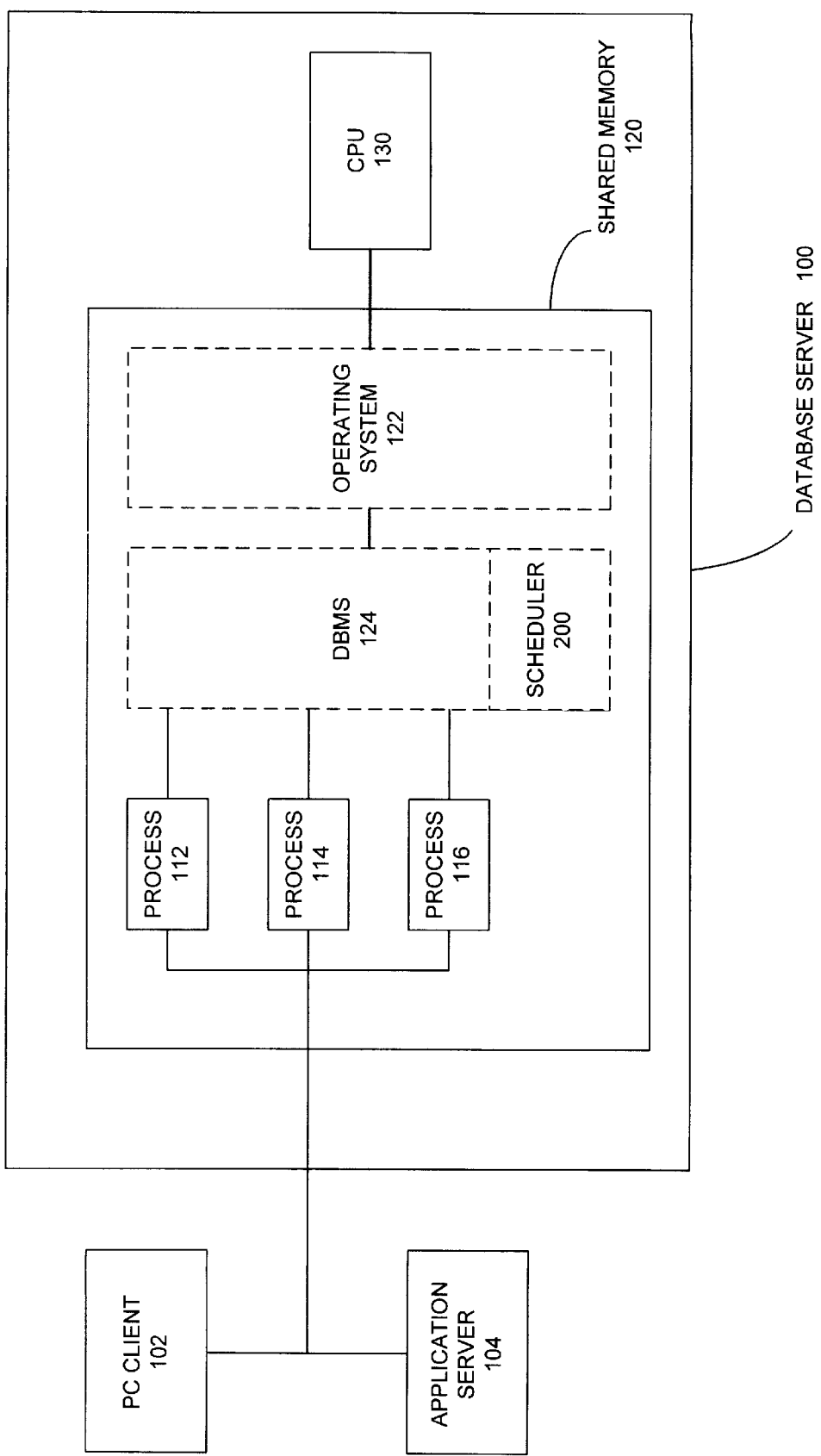
FIG. 1 illustrates a database server on which one embodiment of the invention may be practiced.

Class—a plurality of resource requesters. In one variation, a database administrator or system manager assigns a resource requester to a class.

Plan—a scheme for allocating a resource among a plurality of classes and/or sub-plans in accordance with a policy.

Policy—a strategy for allocating a resource.

Resource requester—an entity requesting use of, or access to, a system resource.

Sub-plan—a scheme for allocating a resource among a plurality of classes in accordance with a policy.

DETAILED DESCRIPTION OF THE INVENTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. For example, the present invention is described predominantly in terms of a database management system including a scheduler for scheduling or allocating a processor's execution time among a plurality of requesting entities. However, the concepts discussed herein are broad enough to provide for the allocation of any computer system resource among a plurality of entities needing the resource, within or without a particular application environment.

Throughout this detailed description, numerous specific details are set forth. To one skilled in the art, however, it will be understood that the present invention may be practiced without such specific details. In other instances, well-known control structures and system components have not been shown in detail in order not to obscure the present invention.

The present invention is not limited to any one particular implementation technique. Those of ordinary skill in the art will be able to implement the invention with various technologies without undue experimentation once the functionality to be carried out by such components is described. In some instances, components implemented by the present invention are described at an architectural, functional level. Many of the elements may be configured using well-known structures. Additionally, for logic to be included within the system of the present invention, functionality and flow diagrams are described in such a manner that those of ordinary skill in the art will be able to implement the particular methods without undue experimentation. It should also be understood that the techniques of the present invention can be implemented using a variety of technologies. For example, the resource scheduler described herein may be implemented in software running on a computer system, or implemented in hardware utilizing either a combination of microprocessors or other specially designed application specific integrated circuits, programmable logic devices, or various combinations thereof.

Sharing Resources in a Database Management System Environment

In one embodiment of the invention, a database management system (DBMS) is provided for operation on a database server. The DBMS includes a scheduler for allocating processor time among the various users, processes and jobs interacting with the DBMS environment. Illustratively, processor time is allocated in periods of time (e.g., "quanta") on the order of 20 milliseconds. The specific duration of allocable processor time may be determined by an operating system executing on the database server independently from the DBMS.

FIG. 1 depicts an illustrative database management system operating on database server 100. DBMS software 124 and operating system 122 are resident in shared memory 120, where they are executed by processor (or CPU) 130. DBMS software 124 includes scheduler 200. In an alternative embodiment, scheduler 200 is separate from DBMS software 124.

In the illustrated embodiment, the DBMS serves one or more clients. Illustratively, client 102 is a small computer system, such as a microcomputer, and client 104 is an application server offering the DBMS services of database server 100 to multiple end users. DBMS processes also reside in memory 120 and operate on behalf of end users, clients, a database administrator (DBA), or another process. Three database processes 112, 114 and 116 are illustrated in FIG. 1. One skilled in the art will recognize that server 100 can be configured to operate a wide range of processes numbering from a few into the thousands and that the scope of the invention is not limited by the number or type of processes executed on server 100.

Database processes executing on server 100 share memory 120, which is coupled to processor 130. In an alternative embodiment, server 100 employs multiple processors. In order to maximize the use of processor 130, one or more DBMS processes that are ready to execute (i.e. are "runnable") are illustratively placed in a run queue (not shown in FIG. 1) within memory 120. When an executing process completes execution or otherwise relinquishes control of the processor, a process within the run queue takes over.

In a present embodiment of the invention, DBMS software 124 is Oracle® RDBMS version 8.1 by the Oracle Corporation of Redwood Shores, Calif. and operating system 122 is Solaris, by Sun Microsystems, Inc. of Palo Alto, Calif. DBMS software 124 illustratively includes a portion of operating system-dependent code to interface between operating system 122 and DBMS software 124. In such an embodiment, the majority of the instructions included in DBMS software 124 are identical regardless of the brand or version of operating system 122. The operating system-dependent code, however, is tailored to the specific operating system (e.g., Solaris, Unix, Windows NT).

Operating system 122 manages the database server's resources (e.g., disk space, memory, network bandwidth, and processor 130) at a low level, sharing them among all requesting entities. However, a primary function of database server 100 in the present embodiment is to operate DBMS software 124 and serve the DBMS' clients and users. Therefore, the DBMS environment consumes the vast majority of the server's resources, including the execution time of processor 130. Thus, although the operating system manages processor time at a low level, most of the processor time is used within the DBMS where it is partitioned among classes of requesting entities by scheduler 200 as described below. Although in the present embodiment the scheduler simply allocates processor time among requesters (i.e., DBMS users, processes and jobs), in alternative embodiments the scheduler allocates other resources.

Scheduler 200 is highly flexible and employs an allocation, or scheduling, plan that is dynamically selectable. Multiple scheduling plans may be configured and stored on the server, although only one plan is active at a time. The active plan may be exchanged for another plan during the operation of the DBMS and server. A scheduling plan partitions processor time among classes of requesters assembled by a DBA or system manager. Classes and scheduling plans are further described below, following the description of an illustrative scheduler.

Description of a Database Scheduler

Figure 2:
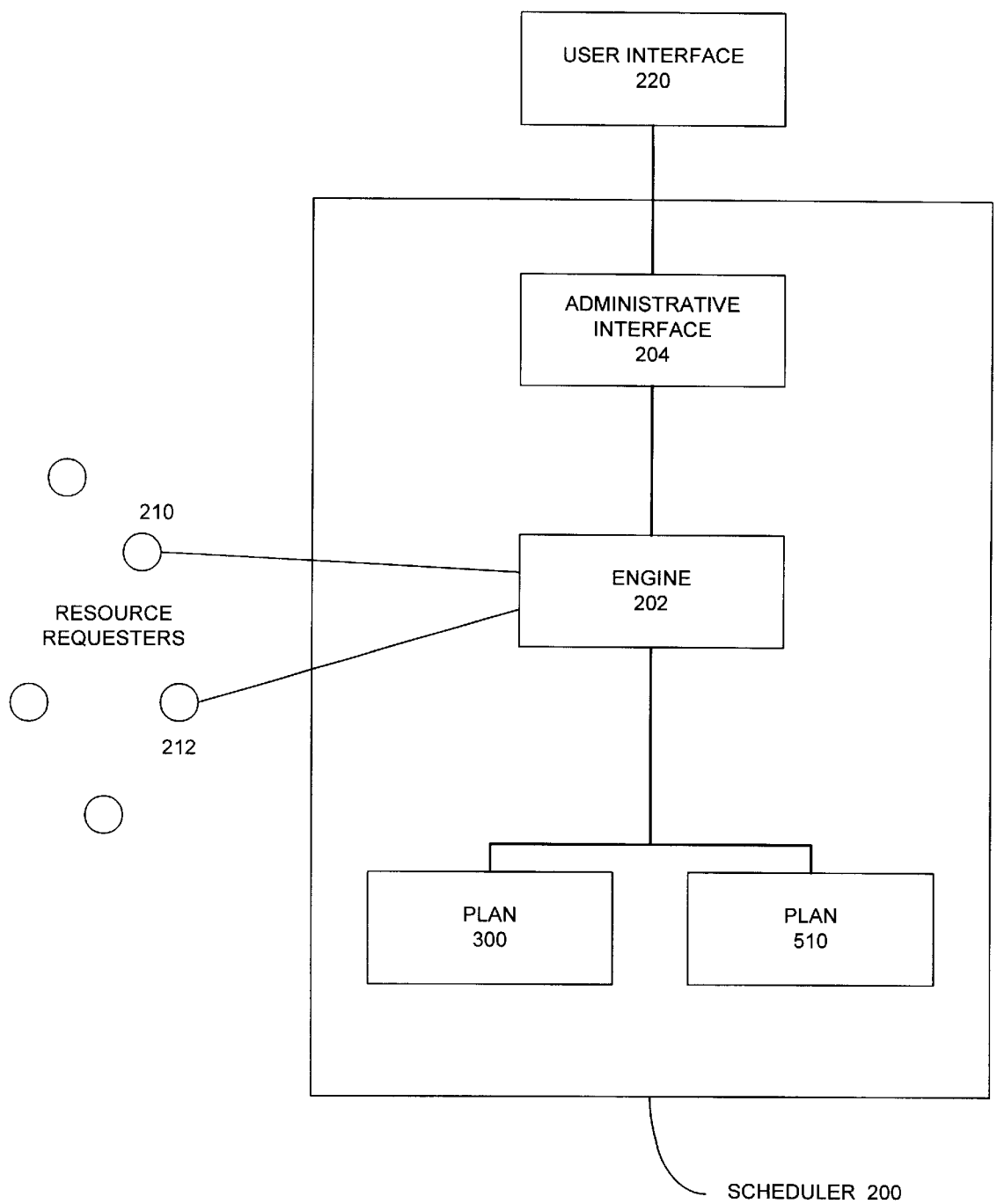
FIG. 2 is a block diagram illustrating a resource scheduler according to one embodiment of the invention.

With reference now to FIG. 2, scheduler 200 is depicted according to one embodiment of the invention. In the illustrated embodiment, the scheduler comprises a portion of DBMS software 124 (from FIG. 1) other than operating system-dependent code. In this embodiment, multi-level scheduler 200 allocates processor time among various entities, herein termed "resource requesters." Resource requesters illustratively include processes and jobs (such as processes 112, 114 and 116 from FIG. 1) needing processor time to execute on behalf of DBMS clients and users.

Scheduler 200 includes engine 202, administrative interface 204, and one or more scheduling plans. Two scheduling plans 300, 510 are depicted in FIG. 2, although one skilled in the art will recognize that the number of plans configured and stored within scheduler 200 does not limit the scope of the present invention. Only one of plans 300, 510 at a time is implemented (i.e., "active") by scheduler 200 during the operation of the DBMS. A DBA may, however, exchange the active plan for a different one even during operation of the DBMS.

Administrative interface 204 is coupled to user interface 220, which is external to scheduler 200. User interface 220 and administrative interface 204 are employed by a DBA to configure scheduler 200. Through these interfaces, the DBA can configure (e.g., create, modify and delete) a class of resource requesters or select a scheduling plan for implementation by scheduler 200. The DBA can also modify scheduling plans, such as to change the classes within a plan or alter a plan's "policy" (described below) for allocating processor time.

In a present embodiment, the DBA also employs user interface 220 and administrative interface 204 to observe the performance of scheduler 200. Illustratively, parameters are stored by scheduler 200 concerning its operation, such as statistics reflecting the actual allocation of processor time, the number of entities requesting processor time, the amount of time that requesters or requester classes must wait to receive processor time, etc.

Resource requesters communicate with scheduler 200 in order to request and receive processor execution time. Two resource requesters 210, 212 are illustrated in FIG. 2. Illustratively, scheduler 200 keeps a count of the number of requesters that are "runnable," or ready to execute. In accordance with the active scheduling plan, engine 202 determines which requester class and/or individual requester is to receive processor time as it becomes available.

Only one of scheduling plans 300, 510 is active (i.e., is implemented by scheduler 200) at a time, but the active plan can be changed during the operation of the DBMS. In other words, engine 202 can quickly switch from implementing plan 300 to implementing plan 510 without interrupting the operation of the DBMS or server 100. Plans are installed at the time the DBMS is initialized and can be removed, modified and added as necessary. As described below, a plan allocates processor time among classes of resource requesters according to an associated policy and numerical values associated with each class. One plan may be well suited to efficiently meet the needs of certain types of requesters at certain times (e.g., during the business day when most of the requesters comprise processes representing on-line, interactive, users). A different plan, possibly comprising the same classes but having a different policy or different numerical values attached to the classes, may be more effective than the first at a different time (e.g., at nighttime, when most of the requesters are batch processes).

Scheduling Plans

Figure 3:
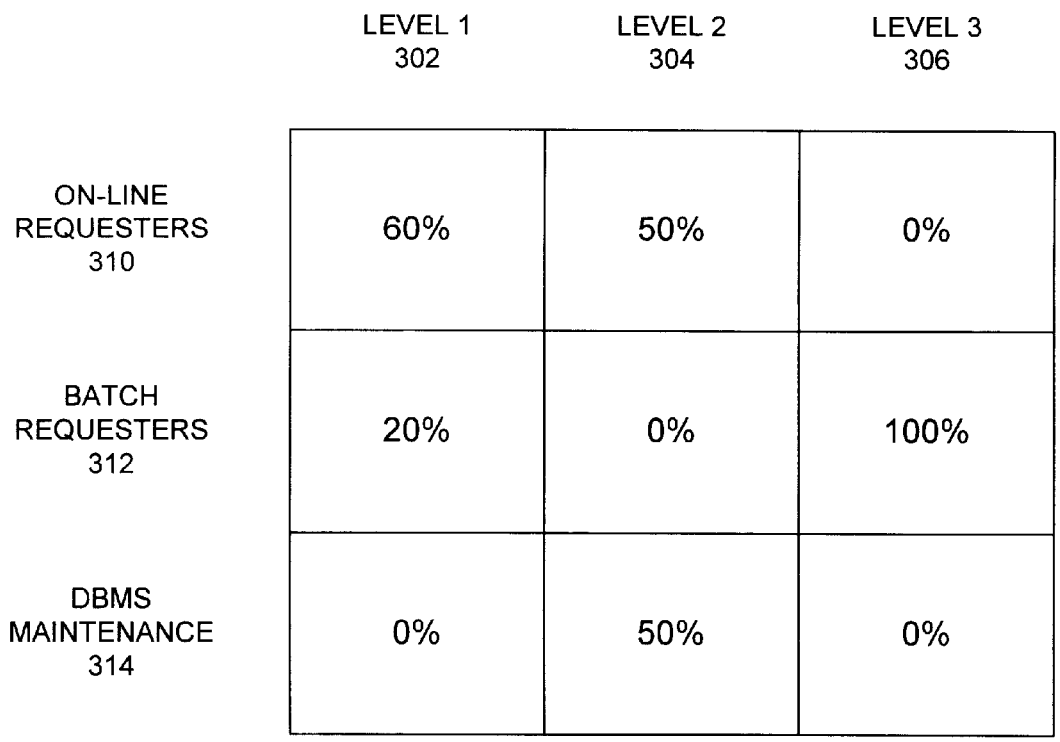
FIG. 3 depicts an emphasis plan for scheduling resources according to one embodiment of the invention.

The following is a description of an illustrative scheduling plan depicted in FIG. 3. It will be understood that a wide variety of scheduling plans may be configured in accordance with the present invention. In general, however, a DBA first assembles resource requesters into classes. Illustratively, class assignments are made based upon the requesters' requirements for processor time (e.g., batch vs. on-line users, administrative and maintenance functions vs. data processing). The DBA then assembles one or more classes into a plan. Within a plan, processor time is allocated to classes of requesters according to numerical values associated with each class in the plan. Multiple plans can include the same classes with different numerical values. In addition, a plan may be included in another plan as a sub-plan.

Within each plan, the DBA specifies an inter-class policy for partitioning processor time between the classes included in the plan. When a plan is to be implemented by scheduler 200, each class receives processor time according to its associated numerical value and the specified scheduling policy. An intra-class policy may also be specified for allocating processor time within a class. As mentioned above, only one plan is active at a time (which plan can include sub-plans), and each class can only be referred to in a single active plan (or sub-plan). One advantageous policy, termed an "emphasis" policy, is described immediately below. Other policies are possible, such as round-robin, strict preemption, priority, etc.

In a present embodiment of the invention plan 300 is an "emphasis" plan. In other words, plan 300 allocates processor time between classes of resource requesters according to an "emphasis" policy. Specifically, an emphasis plan or policy requires the division of processor time according to percentages of available processor time. When the emphasis policy is used for inter-class allocation, different classes of resource requesters are given different (or possibly equal) levels of emphasis relative to each other. Intra-class allocation may also use the emphasis policy. Thus, in an emphasis plan, individual resource requesters and/or classes of resource requesters are assigned specific percentages of available processor time. In a present embodiment of the invention, processor time is further partitioned in emphasis plans in multiple levels.

With reference now to FIG. 3, DATABASE plan 300 is depicted. DATABASE plan 300, which is an emphasis plan, consists of three levels (Level 1, Level 2 and Level 3), represented by the numerals 302, 304 and 306. On-line (or interactive), batch and DBMS maintenance classes are represented by the numerals 310, 312 and 314.

Within DATABASE plan 300, all processor time available to the DBMS is first allocated in Level 1 according to the percentages associated with each class included in the level. Thus, online and batch requesters receive 60% and 20%, respectively, of the available processor time. The processor time not allocated in Level 1 (i.e., 20% of all available processor time) is allocated among the classes participating in Level 2 according to their assigned percentages. Thus, online requesters and DBMS maintenance tasks each get 50% of the remaining 20% of processor time (i.e., each gets 10% of the total processor time). Finally, if processor time is somehow unallocated after Level 2, it is all allocated to the batch class in Level 3. For example, if a class participating in Level 1 or Level 2 is empty at the time scheduler 200 would have allocated processor time to the empty class, the processor time that would have been allocated to the empty class is given to the batch class in Level 3.

As plan 300 demonstrates, several levels may be configured in a plan. In a present embodiment of the invention, however, a maximum of eight levels may be configured. If, after the last level, processor time remains unallocated, it is recursively allocated according to the active plan.

The use of percentages in emphasis plans allows the allocation of processor time to be more finely-tuned than in a DBMS in which resources are allocated according to a round-robin or priority scheme. For example, a priority scheme may allow a DBA to specify that a first set or class of requesters is to receive faster, longer or preemptive access to processor 130 than a second set or class. An emphasis policy, however, allows the DBA to specify particular percentages of processor time for each set or class. Illustratively, a first class of requesters can be granted a high percentage of the processor's time but a second class can still be assured a certain, lower, percentage of time. Even if a particular class of requesters becomes heavily populated, other classes (and resource requesters in those classes) participating in the plan will not lose processor time as a result. Individual requesters within the over-populated class may, of course, receive less execution time as a result (depending on the intra-class scheduling policy). The DBA can address class over-crowding in several ways under the present invention. The DBA can, for example, change to a different plan that gives additional emphasis to the over-crowded class or that allocates processor time according to a different policy (e.g., round-robin, strict preemption). Alternatively, the DBA can re-configure the class to reduce its population or alter the percentages within the active plan.

When scheduler 200 implements DATABASE plan 300, the actual amount of processor time granted to the various classes is as follows, assuming that each class is adequately populated. On-line users receive 70% of all processor time (60% in Level 1 and 10% in Level 2), batch users receive 20% (Level 1), and DBMS maintenance tasks receive 10% (Level 2). However, if there was no maintenance being performed, on-line users would still receive 70% of the total processing time (from Levels 1 and 2), but batch requesters would then receive the remaining 30% (picking up the additional 10% in Level 3).

One skilled in the art of computer systems will recognize that multi-level plans can be constructed to emulate the priority allocation scheme often used by operating systems. FIG. 4 demonstrates an illustrative priority plan 400. Class 1, Class 2, and Class 3 represent three classes of resource requesters. In each of three levels, one class receives all available processor time. When priority plan 400 is implemented, Class 1 receives all processor time as long as it has at least one member. Only when Class 1 is empty does Class 2 receive processor time. Class 3 receives processor time only when both Classes 1 and 2 are empty.

Figure 5A:
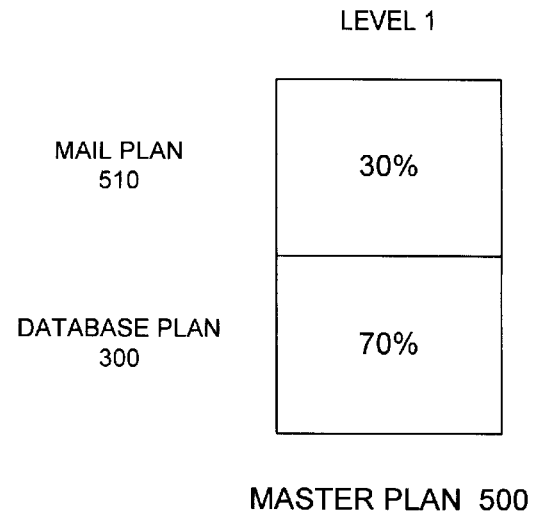
FIGS. 5A–5B depict an emphasis plan having a sub-plan in one embodiment of the invention.
Figure 5B:
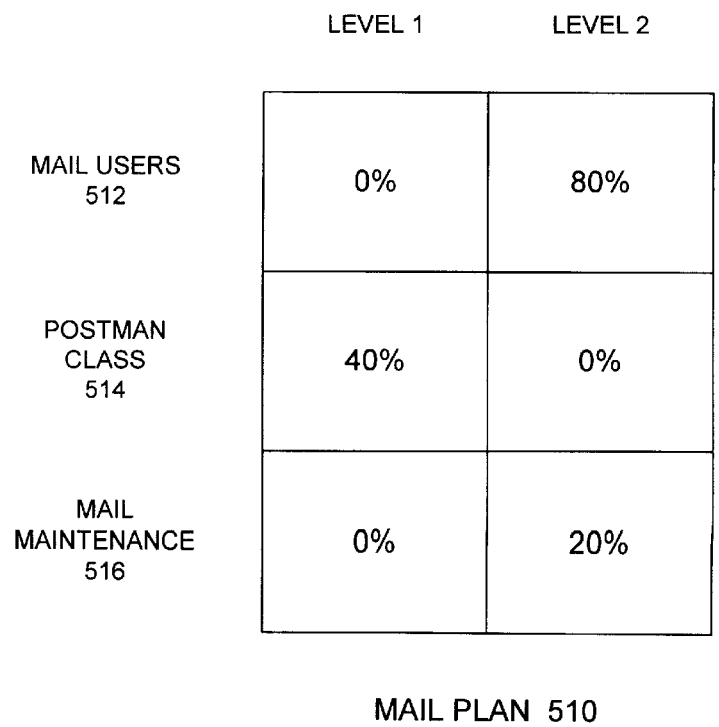

FIGS. 5A and 5B depict a plan having two sub-plans, each of which are emphasis plans. In FIG. 5A, MASTER plan 500 consists of only one level, in which all processor time is divided among the two sub-plans: MAIL plan 510 and DATABASE plan 300.

MAIL plan 510, depicted in FIG. 5B, consists of 2 levels. In Level 1, the Postman class of resource requesters (represented by the numeral 512) will execute 40% of the time while the mail users and mail maintenance classes (represented by the numerals 514 and 516) share the remaining 60% by a ratio of 80 to 20 in Level 2. DATABASE plan 300 is depicted in FIG. 3.

Figure 6:
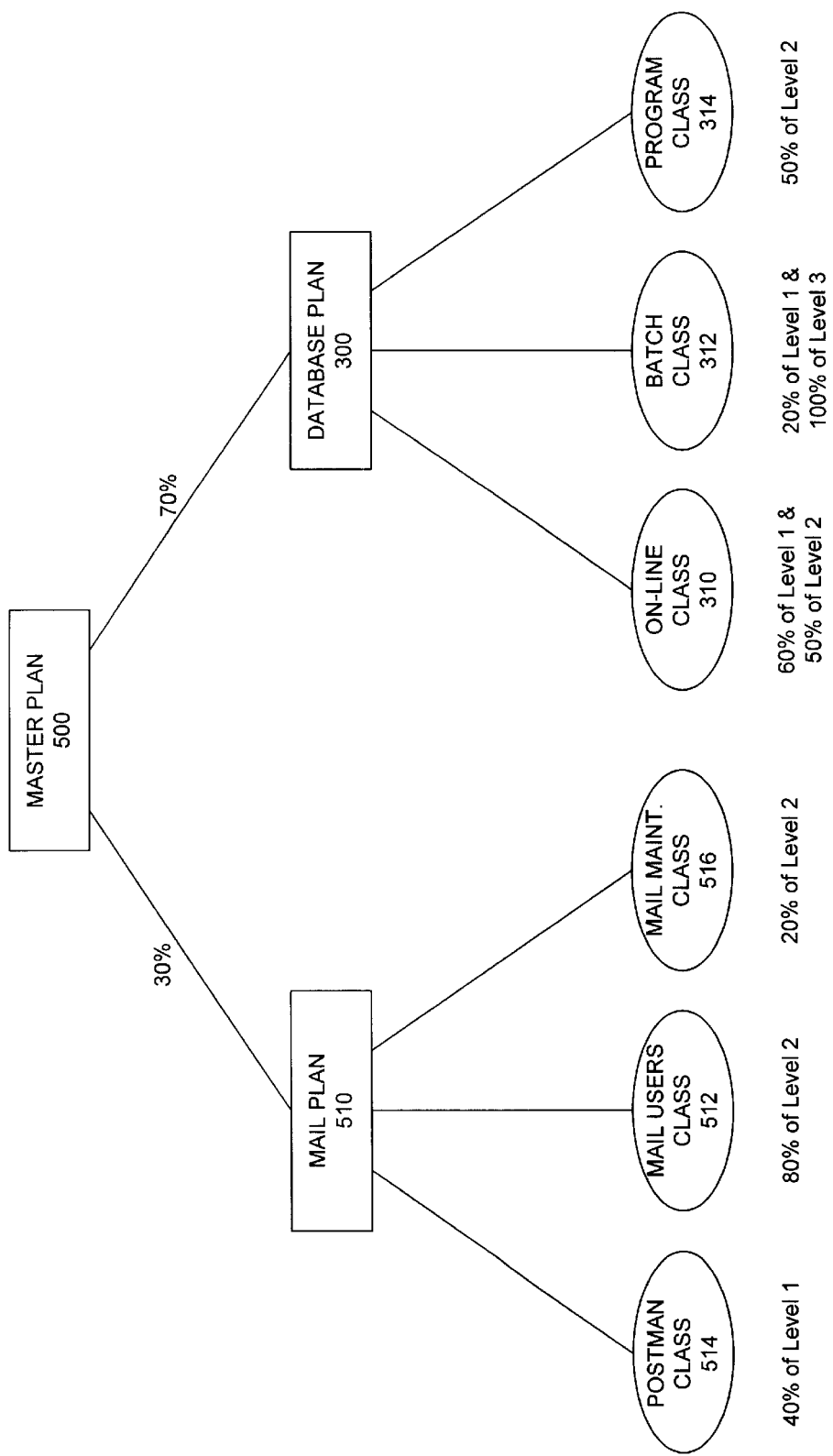
FIG. 6 is a diagram demonstrating the partition of processor time according to the plans of FIGS. 3 and 5A–5B according to an embodiment of the invention.

FIG. 6 is a tree-structured diagram demonstrating the division of processor time according to MASTER plan 500. During the operation of the DBMS, scheduler 200 allocates processor time to the various classes 310, 312, 314, 512, 514, 516 according to their corresponding percentages.

In a present embodiment of the invention, scheduler 200 employs a probabilistic method to choose a requester to be granted processor time. Illustratively, when multiple resource requesters await use of processor 130, engine 202 (from FIG. 2) calls the active plan (e.g., MASTER plan 500 from FIG. 5A). Relying on probabilistic determination to ensure distribution of processor time according to the specified percentages, MASTER plan 500 selects either MAIL sub-plan 510 or DATABASE sub-plan 300. If, for example, MASTER plan 500 selects the MAIL sub-plan, engine 202 then calls MAIL sub-plan 510. MAIL plan 510 then determines (again, in probabilistic fashion) whether to allocate processor time to the Postman class, which is to receive 40% of all processor time distributed in the MAIL plan. If the Postman class is not selected, then there is an 80% chance that the Mail Users class will receive the processor time instead of the Mail Maintenance class.

In an alternative embodiment, instead of requiring the engine to query a plan each time an allocation decision must be made, the active plan may be collapsed so that only one choice must be made. For example, if the Postman class is empty, MASTER plan 500 can select either the Mail Users or Mail Maintenance class immediately upon choosing the MAIL sub-plan. For purposes of this embodiment, a bitmap is maintained to represent which of the established requester classes are populated and which are empty. As one skilled in the art will recognize, the fewer requester classes that are populated, the faster a decision can be made as to which requester class is to be allocated processor time.

In another alternative embodiment, a historical log is kept of the allocation choices made by the active plan (and sub-plans). In this alternative embodiment, scheduler 200 can ensure, over time, allocation of processor time according to the planned percentages. Illustratively, each time a choice is made between sub-plans (e.g., in MASTER plan 500), between levels of a plan, or between classes in a level, the choice is made in an attempt to track the planned percentages. In yet another alternative embodiment, a combination of probability and history is used to make allocation decisions.

Operation of a Multi-Level Scheduler

As stated above, scheduler 200 monitors the need for processor time by resource requesters. To ensure correct allocation of processor 130 among the requesters according to the chosen scheduling policy, scheduler 200 communicates with the requesters, tracks their status, and allocates processor time according to specified inter-class and intra-class scheduling policies.

When a new requester first requests processor time from scheduler 200, thus indicating it is ready to execute, a "virtual thread" is created and associated with the new requester's class. Virtual threads thus indicate those requesters that are runnable, or waiting to execute.

In a present embodiment, resource requesters that are ready to execute are either executing or waiting to execute. Only one requester at a time is executed by each processor in server 100. If waiting to execute (i.e., runnable), a requester is either awake or asleep. A limited number of runnable requesters are kept awake, the rest are put to sleep.

When one requester finishes executing, whether because it has completed its task or because it has used its allotted amount of processor time, the next requester to be executed is taken from the set of awake and runnable requesters. Sleeping requesters cannot be executed until after they are awakened. In one embodiment of the invention, besides any requesters that are executing, only one runnable requester at a time is kept awake. All others are put to sleep. Thus, in this embodiment, once the executing requester relinquishes control of the processor, only one requester is in line to execute and scheduler 200 is thus able to closely control the allocation of processor time among requester classes and individual requesters.

In an alternative embodiment, a range of requesters is kept awake and runnable. Thus, less processor time is wasted in waking and putting requesters to sleep. Requesters are only put to sleep if the number of runnable requesters that are awake is at or above a high threshold value (e.g., three times the number of processors in server 100). Sleeping requesters are only awakened when the number of awake and runnable requesters drops below a low threshold (e.g., the number of processors in server 100).

When an executing requester relinquishes control of processor 130, the operating system gives control of the processor, in accordance with its own allocation method, to a process that is awake and runnable. If there is only one requester in such condition, then regardless of which allocation scheme the operating system uses (e.g., round-robin or priority), that requester will be selected. With multiple processors, scheduler 200 illustratively maintains a separate list of runnable requesters for each processor, although use of a combined list is also within the scope of the invention.

During its execution by processor 130, each requester periodically communicates with engine 202 to inquire whether it may retain control of the processor. In response, engine 202 either tells it to continue executing or commands the requester to relinquish control of the processor and sleep. As long as the requester is allowed to continue execute, it will retain control of the processor and periodically query engine 202.

When the requester stops executing, operating system 122 gives control to a requester that is awake and runnable. Thus, in order to maximize the use of each processor, it is preferable to keep at least one requester awake and runnable for each processor. Therefore, in a present embodiment of the invention in which only one requester is awake and runnable (but not executing) for each processor, when engine 202 commands the executing requester to relinquish control of the processor, the engine passes the requester the identity of a runnable, sleeping, requester that is to be awakened. In other words, instead of the scheduler taking control of the processor just to awaken a sleeping requester, the requester that is giving up control of the processor awakens the new requester before putting itself to sleep. One skilled in the art will recognize that this method of transfer minimizes the loss of usable processor time due to context switching.

Figure 7:
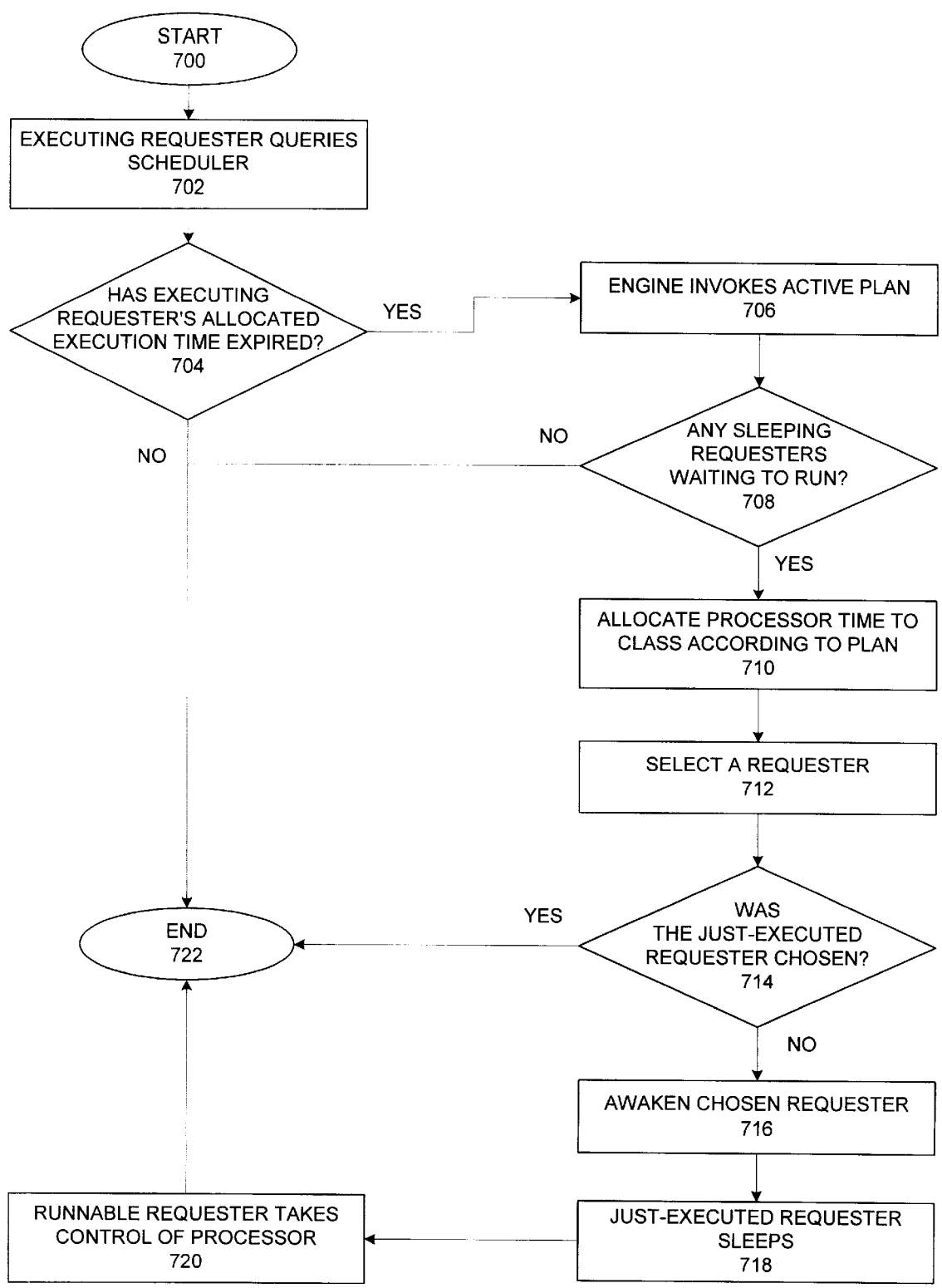
FIG. 7 is a flow chart illustrating a procedure in which resource requesters requiring processor time interact with a resource scheduler to execute in one embodiment of the invention.

FIG. 7 is a flow chart depicting an illustrative method of operating resource scheduler 200 in accordance with an embodiment of the invention. State 700 is a start state. In state 702, scheduler 200 receives a query from resource requester 210, which is being executed by processor 130, wherein requester 210 asks whether it should continue executing.

In state 704 the scheduler determines whether requester 210 has utilized its allocated execution time (e.g., its assigned quanta). If not, requester 210 continues executing and the illustrated method finishes with end state 722. If, however, requester 210 has exhausted its allocated execution time, in state 706 the scheduler engine invokes the active plan (e.g., DATABASE plan 300 from FIG. 3) in order to determine which class of resource requesters should receive processor time.

In state 708 the scheduler determines whether there are any requesters ready or waiting to execute other than requester 210. In order to make this determination, scheduler 200 maintains a list of virtual threads representing runnable requesters, as described above.

If there are fewer runnable requesters, including requester 210, than there are processors, then no requesters are waiting for processor time and there is no need to stop executing requester 210. In such a case, requester 210 continues to execute and the system proceeds to state 722, an end state. The system also proceeds to state 722 from state 708 if there are no sleeping runnable requesters. This situation arises when there are relatively few requesters awaiting processor time (e.g., the number of awake and runnable requesters is within the allowable range described above).

If, however, a sleeping requester must be awakened (e.g., the number of awake and runnable requesters has fallen below the low threshold described above), then scheduler 200 must allocate processor time among the classes of requesters that are waiting for processor time. The system thus proceeds to state 710.

In state 710, a class is chosen in accordance with the inter-class policy in effect for DATABASE plan 300 (i.e., the emphasis policy described above). In addition, a specific requester (e.g., requester 212) is chosen according to the intra-class scheduling policy (e.g., round-robin) associated with the chosen class. In the presently described embodiment of the invention, a probabilistic function is applied to determine which class should receive processor time. In an alternative embodiment, a history is kept to track each requester (and its class) that is executed in order to verify application of the active plan's specified percentages. For purposes of the illustrated embodiment, the chosen class (i.e., the class that includes requester 212) is a different class from that which includes requester 210 (the executing requester). If the class including requester 210 is chosen, scheduler 200 illustratively incorporates a bias toward minimizing context switches and thus tends to allow requester 210 to continue executing and avoid the overhead involved in waking another requester (unless such bias becomes too unfair to other requesters within the class).

In state 712, an individual requester (e.g., requester 212) is selected from within the chosen class and is identified to requester 210 (the requester that is to relinquish control of a processor).

In state 714 it is determined whether the selected requester is the same requester as that which is finishing execution (i.e., requester 210). If so, requester 210 receives an additional quantum and continues executing and the method ends with end state 722. As long as the selected requester (e.g., requester 212) is not the same as the one that finished its quanta, the method continues with state 716.

In state 716, requester 210 awakens requester 212. Requester 210 then puts itself to sleep in state 718 to await its next opportunity to execute. In state 720 the operating system recognizes that processor 130 is idle and selects an executable process from those that are runnable. The system then proceeds to state 722, an end state.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art.

What is claimed is:

1. A method of allocating a resource in a computer system, comprising:

identifying a plurality of requester classes among which the resource is to be allocated, each requester class including one or more requesters of the resource;

constructing a plan specifying an allocation of the resource among the plurality of requester classes, the plan including multiple levels;

for each level in the plan, associating a weight for allocating the resource with each of the plurality of requester classes; and allocating the resource among the plurality of requester classes according to the plan by starting a first level of the plan and allocating the resource to requester classes according to the weights at the first level, and if any of the resource remaining after the first level, continuing on to successive levels of the plan, and allocating the resource according to the weights at each successive level until either the resource is fully allocated or allocation has taken place for each level.

2. The method of claim 1, further comprising:

associating an intra-class policy with each of the plurality of requester classes, the intra-class policy specifying a method of allocating the resource among the requesters in the requester class; and allocating the resource among the requesters included in one of the plurality of requester classes according to the associated intra-class policy.

3. The method of claim 2, wherein the intra-class policy is one of a set of policies including: round-robin, priority, and emphasis.

4. The method of claim 1, wherein each of the weights in a given level of the plan represents a percentage of the resource to be allocated to the associated requester class for the given level.

5. The method of claim 1, wherein the resource includes processor time.

6. A method of allocating a resource in a computer system, comprising:

identifying a plurality of requester classes, each requester class including one or more requesters for the resource;

activating a first preconfigured plan for allocating the resource among the plurality of requester classes;

associating a weight with each of the plurality of requester classes in the first preconfigured plan, the weight specifying a portion of the resource to be allocated to the requester class; and allocating the resource among the plurality of requester classes based on the weights in accordance with a first scheduling policy.

7. The method of claim 6 in which the first scheduling policy is an emphasis policy and the weights are percentages, wherein each percentage represents a portion of the resource to be allocated to the associated requester class.

8. The method of claim 7, further comprising dividing the first plan into N levels, wherein N>1 and each level includes one or more of the plurality of requester classes.

9. The method of claim 8, wherein associating a weight with each of the plurality of requester classes comprises:

for each of the N levels, associating a percentage with each of the plurality of requester classes.

10. The method of claim 9, wherein allocating the resource comprises partitioning the resource among the plurality of requester classes in a first level of the first plan according to the percentages associated with the plurality of requester classes.

11. The method of claim 10, further comprising:

partitioning a remainder portion of the resource among the plurality of requester classes in a subsequent level;

wherein the remainder portion comprises a portion of the resource remaining unallocated after the resource was allocated in a previous level.

12. The method of claim 11, further comprising repeating the partitioning at subsequent levels until either the resource is fully allocated or the resource has been allocated in each of the N levels of the first plan.

13. The method of claim 12, further comprising if the resource has been allocated in each of the N levels and a final portion of the resource remains unallocated, allocating the final portion of the resource among the plurality of requester classes by starting at first level of the first plan, and again allocating the resource according to percentages at successive levels of the first plan.

14. The method of claim 6, further comprising allocating the resource among the requesters comprising a requester class according to a second scheduling policy.

15. The method of claim 14, wherein the second scheduling policy is one of a set of policies including: round-robin, priority, and emphasis.

16. The method of claim 7, further comprising:

deactivating the first plan for allocating the resource; and activating a second preconfigured plan for allocating the resource.

17. A computer system comprising:

a first memory for storing a plurality of process classes, each of the plurality of process classes being associated with N numerical values, where N>1;

a processor having execution time available for allocation among the plurality of process classes;

a scheduler memory for storing a preconfigured plan having N levels for allocating the execution time among the plurality of process classes in each of the N levels, the N levels of the plan corresponding to the N numerical values;

wherein the execution time is allocated among the plurality of process classes according to one or more of the numerical values.

18. The computer system of claim 17, wherein the first memory comprises the scheduler memory.

19. A database system, comprising:

a process memory for storing one or more database processes;

a processor having execution time allocable among the database processes;

a plan module comprising:

a first set of predetermined values associated with the database processes, wherein each of the values represents a share of the execution time that may be allocated to the associated process in a first level of allocation; and a series of instructions for allocating the execution time among the database processes; and a scheduler engine coupled to the plan module for allocating, in one or more levels, the execution time among the database processes in accordance with the series of instructions;

wherein, in response to a query from a first of the database processes being executed by the processor, the scheduler engine identifies a second of the database processes for execution by the processor.

20. An operating system for scheduling execution of processes on a computer system, comprising:

a processor having processor time for allocation to processes;

a first set of processes;

a second set of processes;

a third set of processes;

a first set of percentages for allocating processor time between the first set of processes and the second set of processes, wherein each percentage in the first set of percentages comprises a percentage of processor time; and a second set of percentages for allocating processor time between the first set of processes and the third set of processes;

wherein a first portion of the processor time is allocated according to the first set of percentages and, if a portion of the processor time remains unallocated after allocation according to the first set of percentages, the portion of unallocated time is allocated according to the second set of percentages.

21. A computer-readable medium storing instructions that, when executed by a computer, perform a method for allocating a computer resource among resource requester classes, the method comprising:

maintaining a plurality of resource requester classes, each resource requester class comprising one or more resource requesters;

activating a plan having N>1 levels for allocating the resource among the plurality of resource requester classes in accordance with an associated policy, wherein the policy specifies a method of dividing the computer resource among the plurality of resource requester classes in each level of the plan;

associating an emphasis factor with each of the plurality of resource requester classes in each of the N levels;

allocating the resource among the plurality of resource requester classes in a first level of the plan according to the associated emphasis factors; and unless and until the resource is completely allocated, allocating the resource among the plurality of resource requester classes in a subsequent level of the plan according to the associated emphasis factors.

22. The computer-readable medium of claim 21, wherein each of the emphasis factors in a level comprises a percentage of the resource being allocated within the level to be allocated to the associated resource requester class.

23. The method of claim 1, wherein allocating the resource comprises:

allowing a first requester to use the resource;

preempting the first requester's use of the resource; and allowing a second requester to use the resource.

24. The method of claim 6, wherein allocating the resource comprises:

allowing a first requester to use the resource;

preempting the first requester's use of the resource; and allowing a second requester to use the resource.

25. The database system of claim 19, wherein the plan further comprises a second set of predetermined values associated with the database processes, wherein each of the values represents a share of the execution time that may be allocated to the associated process in a second level of allocation.

26. A computer readable storage medium storing instructions that, when executed by a computer, cause the computer to perform a method of allocating a resource in a computer system, the method comprising:

identifying a plurality of requester classes among which the resource is to be allocated, each requester class including one or more requesters of the resource;

constructing a plan specifying an allocation of the resource among the plurality of requester classes, the plan including multiple levels;

for each level in the plan, associating a weight for allocating the resource with each of the plurality of requester classes; and allocating the resource among the plurality of requester classes according to the plan by starting a first level of the plan and allocating the resource to requester classes according to the weights at the first level, and if any of the resource remaining after the first level, continuing on to successive levels of the plan, and allocating the resource according to the weights at each successive level until either the resource is fully allocated or allocation has taken place for each level.

27. A computer readable storage medium storing instructions that, when executed by a computer, cause the computer to perform a method of scheduling a resource in a computer system, the method comprising:

identifying a plurality of requester classes, each requester class including one or more requesters for the resource;

activating a first preconfigured plan for allocating the resource among the plurality of requester classes;

associating a weight with each of the plurality of requester classes in the first preconfigured plan, the weight specifying a portion of the resource to be allocated to the requester class; and scheduling the resource among the plurality of requester classes based on the weights in accordance with a first scheduling policy.

* * * * *